United States Patent
Ray

(10) Patent No.: US 10,149,548 B2
(45) Date of Patent: Dec. 11, 2018

(54) PORTABLE BED

(71) Applicant: Alexander L. Ray, Bloomington, IN (US)

(72) Inventor: Alexander L. Ray, Bloomington, IN (US)

(*) Notice: Subject to any disclaimer, the term of this patent is extended or adjusted under 35 U.S.C. 154(b) by 416 days.

(21) Appl. No.: 14/994,333

(22) Filed: Jan. 13, 2016

(65) Prior Publication Data

US 2017/0196363 A1    Jul. 13, 2017

(51) Int. Cl.
| | |
|---|---|
| *A47C 17/70* | (2006.01) |
| *A47C 17/74* | (2006.01) |
| *A47C 17/76* | (2006.01) |
| *A47C 31/00* | (2006.01) |
| *F16B 2/10* | (2006.01) |
| *F16B 2/18* | (2006.01) |

(52) U.S. Cl.
CPC .............. *A47C 17/70* (2013.01); *A47C 17/74* (2013.01); *A47C 17/76* (2013.01); *A47C 31/00* (2013.01); *F16B 2/10* (2013.01); *F16B 2/185* (2013.01)

(58) Field of Classification Search
CPC ....... A47C 17/64; A47C 17/645; A47C 17/70; A47C 17/76; A47C 19/005; A47C 19/12; A47C 19/126; F16M 13/00; F16M 13/02; F16M 13/022
USPC .......... 5/110–112, 114, 116, 117; 248/229.1, 248/229.13
See application file for complete search history.

(56) References Cited

U.S. PATENT DOCUMENTS

| | | | | |
|---|---|---|---|---|
| 1,528,129 | A * | 3/1925 | Phillips | A47C 17/80 5/114 |
| 2,254,939 | A * | 9/1941 | Elias | A47D 9/005 182/179.1 |
| 2,617,999 | A * | 11/1952 | Mitchell | A47D 9/005 5/111 |
| 3,336,060 | A * | 8/1967 | Bradford | A61G 1/003 403/108 |
| 3,426,367 | A * | 2/1969 | Bradford | A47C 17/645 403/108 |
| 3,933,164 | A * | 1/1976 | Ness | A45F 4/06 135/128 |
| 4,034,518 | A * | 7/1977 | Trecker | A45C 9/00 190/11 |
| 4,685,161 | A * | 8/1987 | Zalman | A47C 19/126 403/55 |
| 5,301,377 | A * | 4/1994 | Kim | A47C 17/645 5/110 |
| 2017/0196363 | A1 * | 7/2017 | Ray | A47C 17/70 |

* cited by examiner

*Primary Examiner* — Robert G Santos
(74) *Attorney, Agent, or Firm* — Douglas E. Warren

(57) ABSTRACT

A portable bed having a foldable main frame assembly that includes a strap assembly for attaching the portable bed to a standard bleacher seat with an adjustable length strap assembly that includes a clamp for gripping the standard bleacher seat wherein the foldable main frame also includes a plurality of adjustable leg assemblies that can be adjusted for height and to match the angle of unlevel surfaces upon which the portable bed is positioned.

17 Claims, 7 Drawing Sheets

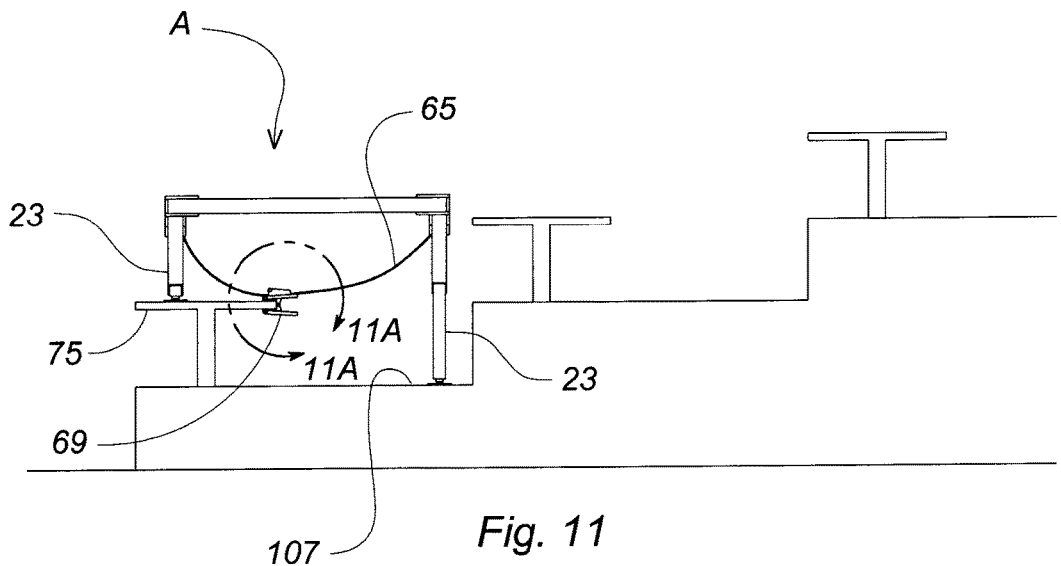
Fig. 11
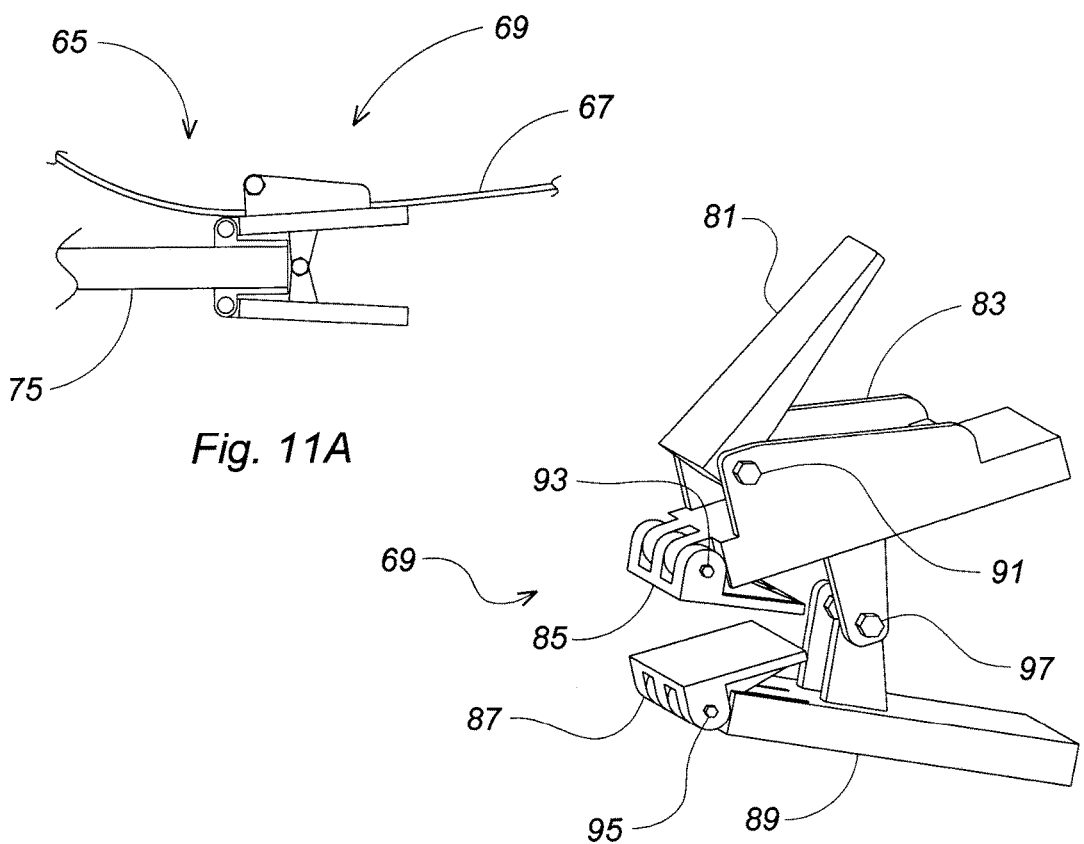
Fig. 11A
Fig. 11B

PORTABLE BED

CROSS REFERENCE TO RELATED APPLICATIONS

Not applicable.

STATEMENT REGARDING FEDERALLY SPONSORED RESEARCH

Not Applicable.

BACKGROUND OF THE INVENTION

During certain types of events there is a need to provide individuals with a way to rest between certain sessions of an event. That resting method would generally include a way in which the individual could rest in a reclined position on some sort of bed. Because most such needs arise during intermissions between athletic competitions, the location and installation of the resting method needs to be near the focal point of the athletic event in order for the individual to be near enough to the competition to be aware of the event schedule as it occurs and to be able to quickly recover from the resting position and enter the event.

In one such field athletic competition, that is wrestling, the need to provide this method of resting is quite pronounced. This rest is critical in wrestling competitions because the high level of essentially isometric activities used to engage a wrestling bout during a competition against a competitor can almost entirely deplete the available energy stored with the competitor's muscle fiber. In fact, at the end of certain wresting bouts it can become difficult for the wrestling competitor to be able to walk steadily away from the competition arena.

What is needed is a portable bed that can be unfolded and mounted onto the bleachers of an athletic field such that the bed is near enough to the actual competition arena to allow the exhausted wrestling competitor to quickly move from the wrestling arena to the portable bed, while also allowing the competitor to be near enough to the competition arena to give the competitor the chance to quickly respond when called back to the arena for other bouts in the event. It would also be preferred that any such portable bed have the capability of being installed within the bleachers usually constructed near the wrestling arena in a manner that allows the portable bed to be adjusted to a level position and be attached securely enough to the bleachers that the portable bed be stable enough for use by the competitor.

SUMMARY OF THE INVENTION

This section provides a general summary of the disclosure, and is not a comprehensive disclosure of its full scope or all of its features.

In accordance with the various embodiments of the present invention, this invention relates to a portable and foldable bed that can be readily transported between the location of athletic events while also being capable of being securely mounted to the bleachers constructed in a standard athletic arena and allow the user to be able to adjust the resting surface of the bedding of the portable bed to make that upper surface level enough for the competitor to rest comfortably on the portable bed.

In other embodiments of the present invention, the portable bed can have other uses such as camping and disaster/emergency management where temporary shelters may be set up in gymnasiums, stadiums, etc. to increase capacity of the seating area. In yet other uses of the portable bed, the bed can be positioned on flat level ground when needed.

DESCRIPTION OF THE DRAWINGS

In the accompanying drawings which form part of the specification:

FIG. 11 is an end view of one embodiment of the present invention after installation onto a normal bleacher seat assembly;

FIG. 11A is a close-up end view of one embodiment of the present invention showing the bleacher clamp mounted to a bleacher;

FIG. 11B is a perspective view of the bleacher clamp in one embodiment of the present invention;

Corresponding reference numerals indicate corresponding steps or parts throughout the several figures of the drawings.

Figures 1, 2:
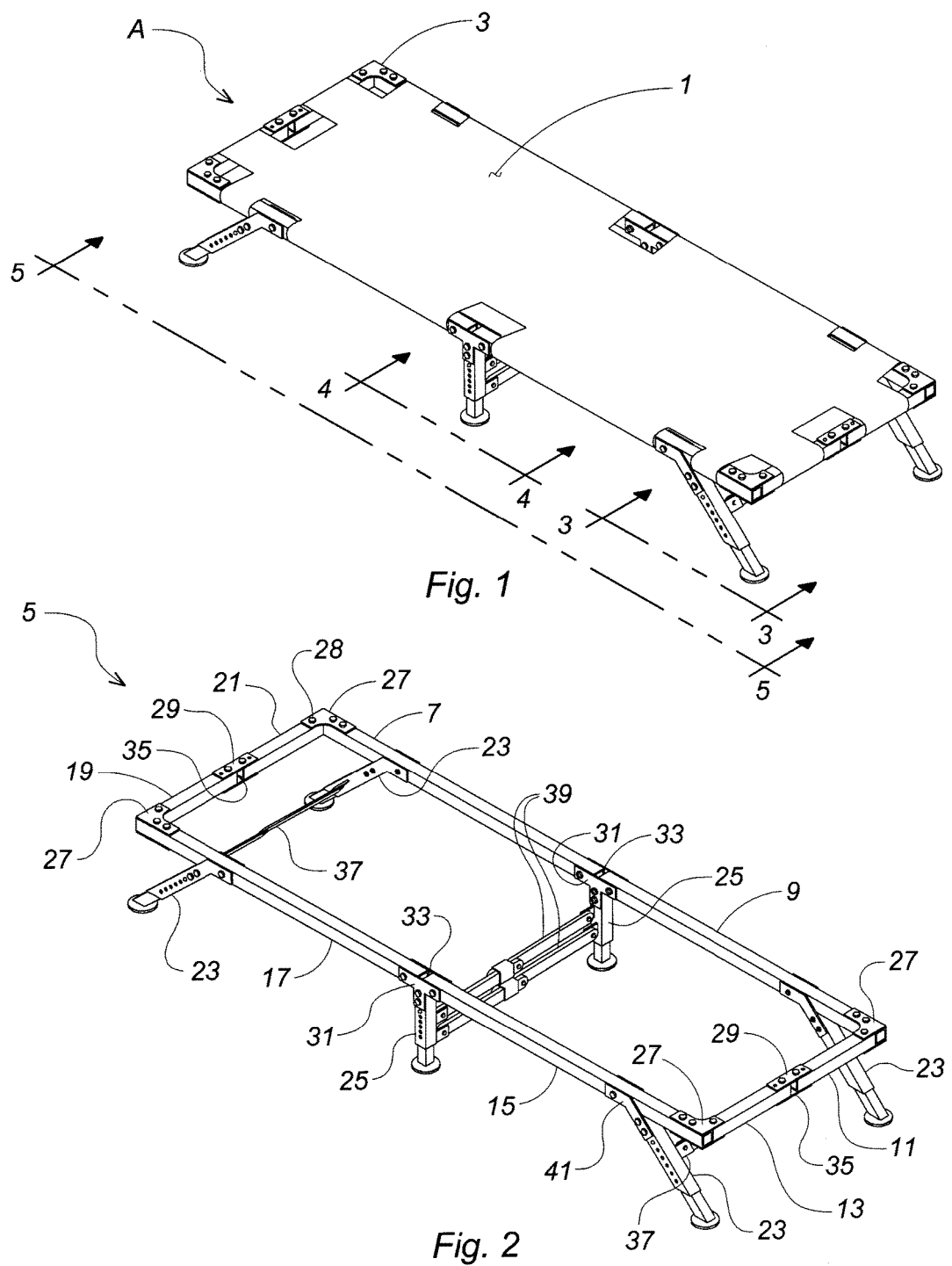
FIG. 1 is a perspective view of one embodiment of the present invention.
FIG. 2 is a perspective view of one embodiment of the present invention with the bedding removed to show the frame assembly.

While specific embodiments of the present invention are illustrated in the above referenced drawings and in the following description, it is understood that the embodiments shown are merely some examples of various preferred embodiments and are offered for the purpose of illustration only, and that various changes in construction may be resorted to in the course of manufacture in order that the present invention may be utilized to the best advantage according to circumstances which may arise, without in any way departing from the spirit and intention of the present invention, which is to be limited only in accordance with the claims contained herein.

DETAILED DESCRIPTION OF AT LEAST ONE PREFERRED EMBODIMENT OF THE INVENTION

In the following description, numerous specific details are set forth such as examples of some preferred embodiments, specific components, devices, and methods, in order to provide a thorough understanding of embodiments of the present disclosure. It will be apparent to a person of ordinary skill in the art that these specific details need not be exclusively employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication, and manufacture for those of ordinary skill.

At least one preferred embodiment of the present invention is illustrated in the drawings and figures contained within this specification. More specifically, certain preferred embodiments of the present invention are generally disclosed and described in FIGS. 1-13.

Referring now to FIG. 1, one embodiment of a Portable Bed A is shown. In this embodiment, a bedding 1 is installed onto a main frame assembly 3.

FIG. 2 shows one embodiment of the Portable Bed A with the bedding 1 removed from the main frame assembly 3. In the present embodiment, the main frame assembly comprises a number of components that, when combined, form a generally rectangular frame 5 having a plurality of legs that are braced by at least one brace. More specifically, the rectangular frame 5 comprises a first longitudinal member 7, a second longitudinal member 9, a first transverse member 11, a second transverse member 13, a third longitudinal member 15, a fourth longitudinal member 17, a third transverse member 19, and a fourth transverse member 21. In this embodiment all these members are made from a light weight metal square tube. It will be appreciated by those skilled in the art, however, that other materials may be used in these frame members as long as the material selected is durable and strong enough to sufficiently support the stresses placed upon the Portable Bed A when used by a person weighing at least 250 pounds when the Portable Bed is in use. The bedding 1 can be made from any material such as cloth or canvas or any other type of material as long as the material selected is strong enough to support the weight that is intended to be placed upon the Portable Bed A.

As further shown in FIG. 2, each of the frame members is interconnected with an adjacent member by means of connection brackets. The rectangular frame 5 comprises a first longitudinal member 7, a second longitudinal member 9, a first transverse member 11, a second transverse member 13, a third longitudinal member 15, a fourth longitudinal member 17, a third transverse member 19, and a fourth transverse member 21.

The first longitudinal member 7 is pivotally connected to the second longitudinal member 9 by two longitudinal brackets 31. Likewise, the third longitudinal member 15 is pivotally connected to the second longitudinal member 17 by two longitudinal brackets 31. The first transverse member 11 is pivotally connected the second transverse member 13. The third transverse member 19 is pivotally connected to the fourth transverse member 21.

The members of the rectangular frame 5 are connected together at the corners by a plurality of corner brackets 27. It is noted that the corner brackets are rigidly connected to the first longitudinal member 7, the second longitudinal member 9, the third longitudinal member 15, and the fourth longitudinal member 17. These same corner brackets 27 are pivotally connected to the first transverse member 11, the second transverse member 13, the third transverse member 19, and the fourth transverse member 21.

In the present embodiment, the four corner brackets 27 are connected to the longitudinal members and the transverse members by fasteners by a plurality of fasteners 28. Each of these fasteners 28 are installed by passing the fastener through one of a plurality openings in each of the corner brackets and each of the frame members of the rectangular frame. In this embodiment, the fasteners are threaded fasteners that are held in place by the installation of locknuts 30. The use of threaded fasteners 28 in conjunction with locknuts 30 allows the corner brackets 27 to be rigidly connected to the longitudinal members 7, 9, 15, and 17 by the full tightening of the locknuts onto the threaded fasteners. The use of threaded fasteners 28 in conjunction with locknuts 30 also allows the corner brackets 27 to be pivotally connected to the transverse members 11, 13, 19, and 21 by tightening of the locknuts onto the threaded fasteners in less than a full tightening procedure. It is understood that this less than full tightening of the threaded fasteners 28 allows the transverse members to pivot in relationship to the longitudinal members without the eventual loss of a nut that is not a locknut.

It will be appreciated by those of skill in the art that other types of fasteners may also be used while remaining within the intended scope of the various embodiments of this invention. For example, rivets, lock pins, or any other type of fasteners may be used as long as the fastener selected can rigidly attach the corner brackets 27 to the longitudinal members longitudinal members 7, 9, 15, and 17, and pivotally attach the corner brackets to the transverse members 11, 13, 19, and 21.

The first transverse member 11 is pivotally attached to the second transverse member 13 by installing two transverse brackets 29 and a plurality of fasteners 28 and locknuts 30. Similarly, the third transverse member 19 is pivotally attached to the fourth transverse member 21 by installing two transverse brackets 29 and a plurality of fasteners 28 and locknuts 30.

The first longitudinal member 7 is pivotally attached to the second longitudinal member 9 by installing two longitudinal T brackets 31 and a plurality of fasteners 28 and locknuts 30. Similarly, the third longitudinal member 15 is pivotally attached to the fourth longitudinal member 17 by installing two longitudinal T brackets 31 and a plurality of fasteners 28 and locknuts 30.

One corner leg assembly 23 is disposed near each of the four corners of the rectangular frame 5. Each corner leg assembly 23 is pivotally connected to each of the longitudinal members 7, 9, 15, and 17 by a corner leg assembly bracket 41, a fastener 28, and a locknut 30. A center leg assembly 25 is disposed on each of the two longitudinal T brackets 31 that are pivotally connected to the four longitudinal members 7, 9, 15, and 17.

A corner leg brace 37 is pivotally connected the two corner leg assemblies 23 at each end of the rectangular frame 5 with fasteners 28 and locknuts 30. Two center leg braces 39 are pivotally connected to each of the two center leg assemblies 25 with fasteners 28 and locknuts 30.

Figure 3:
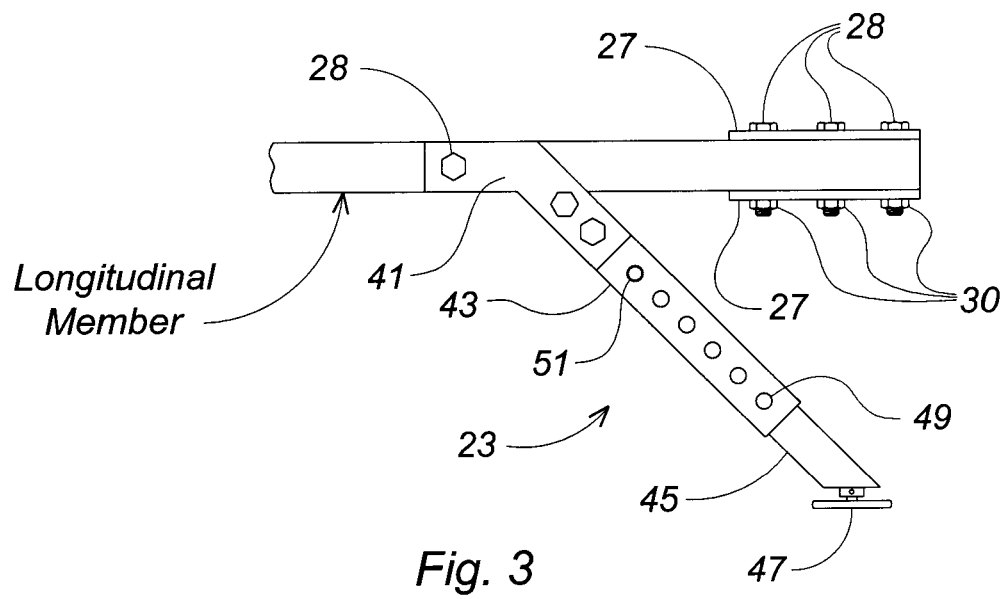
FIG. 3 is a partial side view of one embodiment of the present invention showing one corner portion of the frame.

Referring now to FIG. 3, corner leg assembly 23 comprises a first upper leg assembly 43, a first lower leg assembly 45 and a foot pad 47. In this embodiment, the first upper leg assembly is made from a rectangular tube that is sized and configured to allow the first lower leg assembly 45 to telescope into and out of the first upper leg assembly. The first lower leg assembly 45 has a plurality of detent openings 49 sized and configured to allow a detent pin 51 to slidably reside within each of the detent opening. It is understood that the first lower leg assembly 45 can be adjusted into a desired position within the first upper leg assembly 43 and be retained in that position by allowing the detent pin 51 to be placed in the appropriate detent opening 49 of the first upper leg assembly. A foot pad 47 is connected to an end of the first lower leg assembly 45. Additionally, each of the foot pads 47 is adjustable to adjust the height of each individual foot pad and each of the foot pads includes a ball and socket configuration to allow the foot to self level when the Portable Bed is placed upon an unlevel surface.

Figure 4:
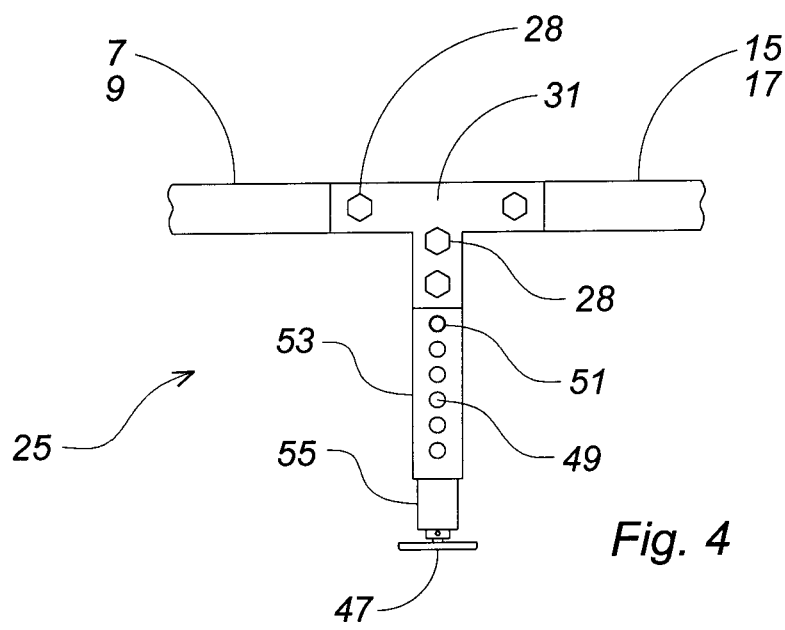
FIG. 4 is a partial side view of one embodiment of the present invention showing one center portion of the frame.

FIG. 4 shows the details of the connection of the two longitudinal members 7 & 9, or 15 & 17. More specifically, a center leg assembly 25 is connected to the longitudinal members 7 & 9 or 15 & 17 by installation of the center leg assembly to the longitudinal T bracket 31 with two fasteners 28 and two locknuts 30. The center leg assembly 25 comprises a second upper leg assembly 53, a second lower leg assembly 55 and a foot pad 47. In this embodiment, the second upper leg assembly 53 is made from a rectangular tube material that is sized and configured to allow the second lower leg assembly 55 to telescope into and out of the second upper leg assembly. Similar to the corner leg assembly 23, the second lower leg assembly 55 has a plurality of detent openings 49 sized and configured to allow a detent pin 51 to slidably reside within each of the detent opening. It is again understood that the second lower leg assembly 55 can be adjusted into a desired position within the second upper leg assembly 53 and be retained in that position by allowing the detent pin 51 to be placed in the appropriate detent opening 49 of the second upper leg assembly. A foot pad 47 is also connected to an end of the second lower leg assembly 55.

The Portable Bed A includes two strap assemblies 65 (FIG. 10) that attached to bedding 1 (FIG. 1). The strap assemblies 65 (FIG. 10) comprises a strap 67, a clamp 69, and a strap length adjuster 73. It is understood that the primary purpose of the two strap assemblies 65 is to secure the Portable Bed A to a standard bleach seat 75 during use of the Portable Bed.

Figure 11C:
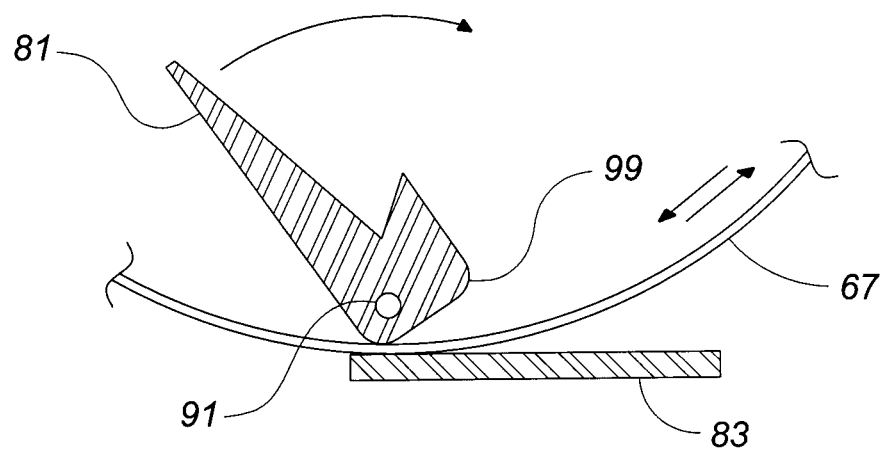
FIG. 11C is a vertical section view of the bleacher clamp in one embodiment of the present invention.

Referring now to FIG. 11A and FIG. 11B, the clamp 69 comprises a gripper 81, a clamp body 83, an upper clamp 85, a lower clamp 87, and a lower body 89. The gripper 81 is pivotally attached to the clamp body 83 at a seventh pivot point 91. The upper clamp 85 is pivotally attached to the clamp body 83 at an eighth pivot point 93, the lower clamp 87 is pivotally attached to the lower body 89 at a ninth pivot point 95, and the clamp body 83 is pivotally attached to the lower body 89 at a tenth pivot point 97. The gripper 81 is free to pivot about the seventh pivot point 91. The gripper 81 has a clamping lobe 99 as shown in FIG. 11C. It is understood that the primary purpose of the clamping lobe 99 is to press against an upper strap surface 103 of the strap 67 when the gripper 81 is rotated around the seventh pivot point 91 to thereby retain the strap in a fixed position in relation to the clamp body 83.

Figure 11D:
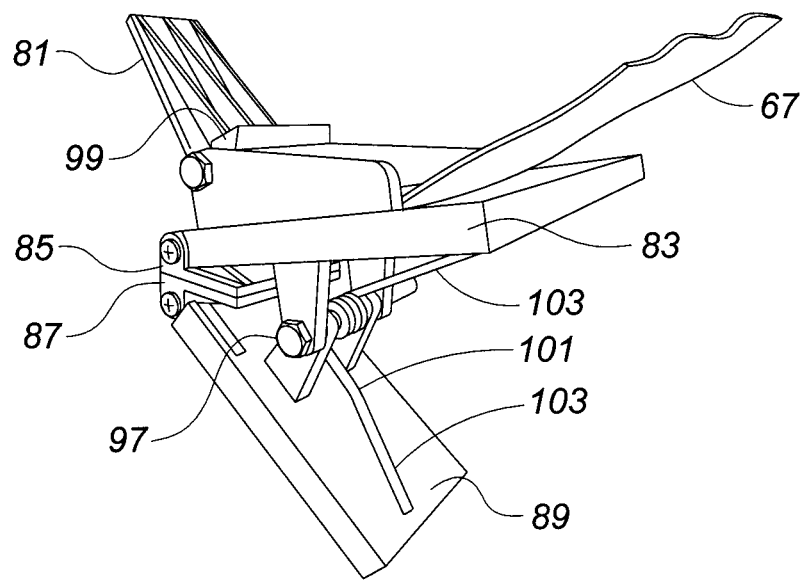
FIG. 11D is a perspective view of the bleacher clamp in one embodiment of the present invention.
Figure 12:
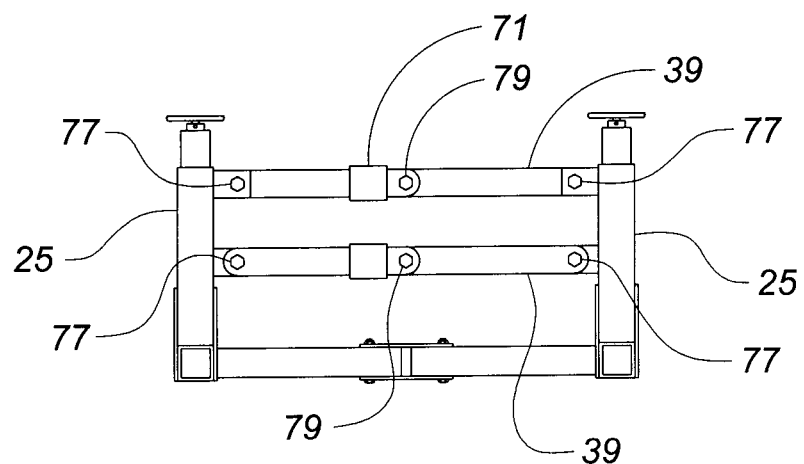
FIG. 12 is an end view of one embodiment of the present invention.
Figure 13:
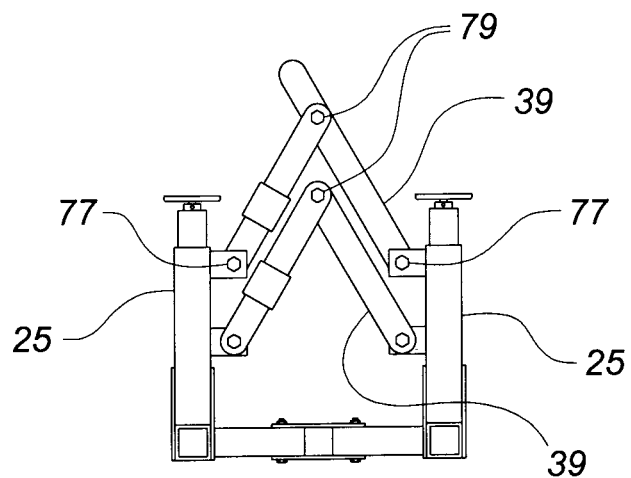
FIG. 13 is an end view of one embodiment of the partially folded present invention.

The clamp body 83 (FIG. 11D) is biased away from a portion of the lower body in a manner that tends to keep the upper clamp 85 pressed against the lower clamp 87 as shown in FIG. 11D. That biased is provided by a spring 101 mounted at the pivot point 97 such that one spring extension 103 presses against a lower surface of the clamp body 83 and a second spring extension 103 presses an upper surface of the lower body 89.

In operation, the present embodiment of the Portable Bed A is assembled as shown in FIG. 1 wherein the main frame assembly 3 has been fully extended with the rectangular frame 5 opened to a flat position and the corner leg assemblies 23 and the center leg assemblies 25 having their foot pads pointed in a downward position. It is understood that as the main frame assembly 3 is fully extended, the corner leg assembly braces 37 and the center leg assembly braces 39 are unfolded until each of those braces is generally straight and extending to their maximum open length between the relevant leg assemblies. For the center leg braces 39, the straightened, unfolded configuration of that leg is maintained by a pivot cover 71 to prevent the center leg brace from scissoring in a manner that would allow the center leg brace to resume its folded configuration.

Once fully opened, the Portable Bed A is then positioned with a complex of bleacher seats 75 as shown in FIG. 11. In that position, a left side of the Portable Bed A is located over the bleacher seat 75 and the right side of the Portable Bed is located over the foot placement area 107 that exists between two generally adjacent bleacher seats. When located in that manner, the corner leg assemblies 23 and the center leg assemblies 25 are either lowered or raised until the foot pad 47 contacts either the bleacher seat 75 or the foot placement area 107. When the leg positions are determined, each leg will remain in that position by the detent pins 51 (FIG. 3 & FIG. 4).

When the Portable Bed A has been positioned as shown in FIG. 11, the strap assembly 65 is used to keep the Portable Bed in position with regard to the bleacher seat 57 when the Portable Bed is in use. More specifically, the gripper 81 of the clamp 69 is rotated such that the clamping lobe 99 does not contact the strap 67. The clamp 69 is then attached to the bleacher seat 75 as shown in FIG. 11. The strap length adjuster 73 is then adjusted to shorten the overall length of the strap 67 until the strap is generally stretched sufficiently to retain the Portable Bed A into its position. When the strap 67 is tightened, the gripper is rotated toward the clamp body 83 until the clamping lobe 99 presses against the upper surface of the strap. The gripper 81 is then completely rotated toward the clamp body 83 to retain the strap 67 into its position with regard to the clamp 69. The Portable Bed A is then ready for use.

When the Portable Bed A is no longer needed, the Portable Bed is removed from the bleacher seat 75 and can be folded into a collapsed configuration to allow the Portable Bed to be transported or stored.

The Portable Bed A is first removed from the bleacher seat 75 by rotating the gripper 81 to release the clamping lobe 99 from compressing the strap 67. If needed, the strap length adjuster 73 can be used to adjust the overall length of the strap 67 enough allow the Portable Bed A to be released from the bleacher seat 75. After removal of the Portable Bed A from the bleacher seat 75, each of the corner leg assemblies 23 and the center leg assemblies 25 are adjusted to their shortest lengths by pressing the detent pin 51 on each leg and telescoping the lower leg of each leg assembly into the upper leg.

Figure 5:
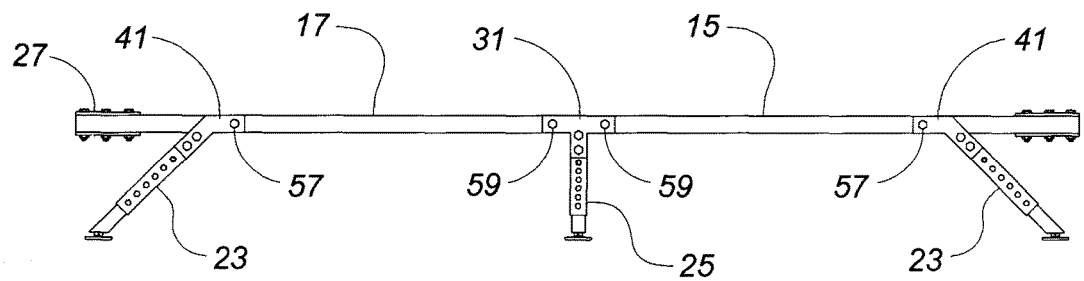
FIG. 5 is a side view of one embodiment of the present invention showing the frame in operational arrangement.
Figure 6:
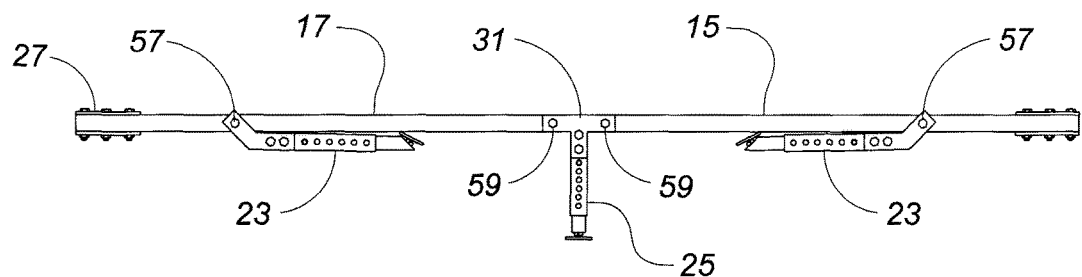
FIG. 6 is a side view of one embodiment of the present invention showing the frame in a first semi-folded arrangement.

The four corner leg assemblies 23 are then folded against the longitudinal members 7, 9, 15, and 17 as shown in FIG. 5 and FIG. 6 by rotating each corner leg assembly around the first pivot point 57. One end of the Portable Bed A is then folded around the second pivot points 59 to position the first end of the Portable Bed near the other end of the portable Bed toward the other end of the Portable Bed as shown in FIG. 7.

Figure 7:
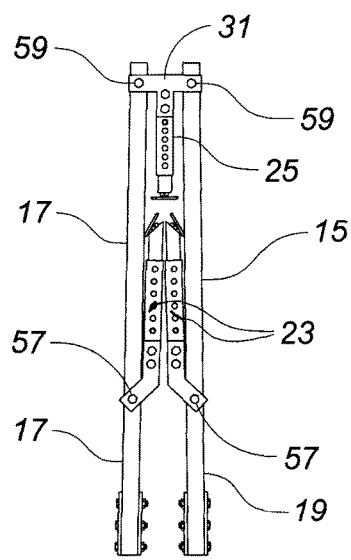
FIG. 7 is a side view of one embodiment of the present invention showing the frame in a second semi-folded arrangement.
Figure 8:
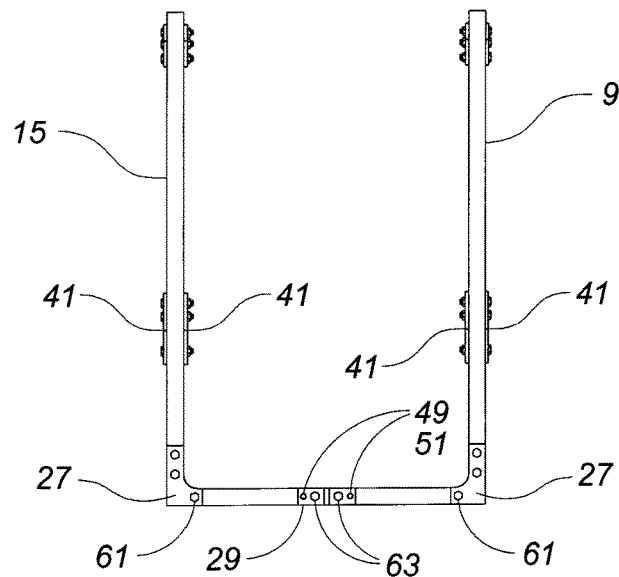
FIG. 8 is an end view of one embodiment of the present invention showing the frame in the second semi-folded arrangement.
Figure 9:
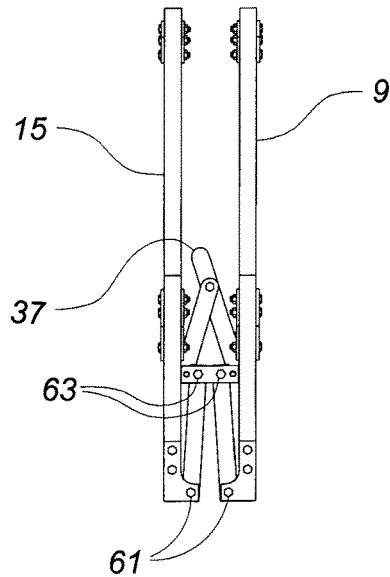
FIG. 9 is a side view of one embodiment of the present invention showing the frame in a fully folded arrangement.
Figure 10:
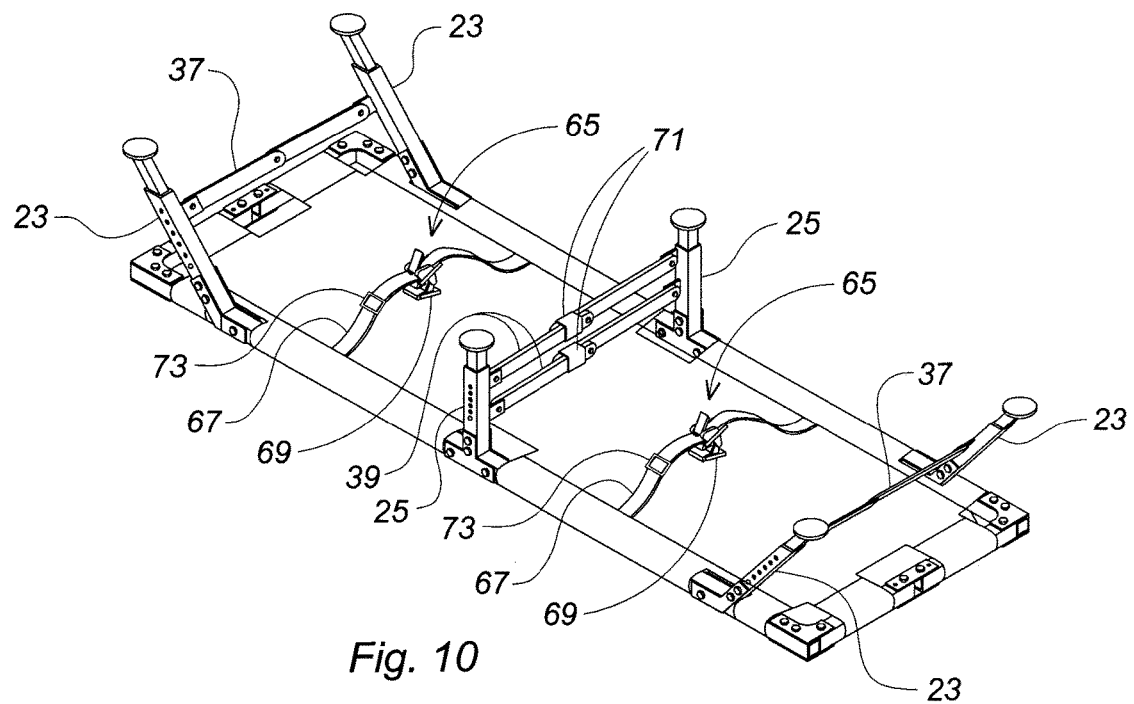
FIG. 10 is a perspective view of the bottom of one embodiment of the present invention.

The partially folded Portable Bed A as shown in FIG. 7 is then further folded as shown in FIG. 8 & FIG. 9 by folding one portion of the Portable Bed toward the other portion of the Portable Bed by folding those portions around the third pivot points 61 and the fourth pivot points 63 until the Portable Bed is folded as shown in FIG. 9. It is understood that the detent pins 51 (FIG. 8) are depressed within the detent pin openings 49 to allow the adjacent transverse members to pivot around pivot points 61 and 63. It is noted that as the Portable Bed A is folded into the configuration as shown in FIG. 9, each of the corner leg assembly braces 37 and the center leg assembly braces 39 are folded around the pivots point. That folding action is also accomplished after the two pivot covers 71 (FIG. 12 & FIG. 13) have been positioned away from the sixth pivot points 79.

After the Portable Bed A has been folded as described above, the Portable Bed is ready for transport and storage. In alternative embodiments, the Portable Bed A can include an enclosure in the form of a bag or a box into which the Portable Bed can be placed for storage and shipment.

In the preceding description, numerous specific details are set forth such as examples of specific components, devices, methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication and manufacture for those of ordinary skill. The scope of the invention should be determined by any appended claims and their legal equivalents, rather than by the examples given.

Additionally, it will be seen in the above disclosure that several of the intended purposes of the invention are achieved, and other advantageous and useful results are attained. As various changes could be made in the above constructions without departing from the scope of the invention, it is intended that all matter contained in the above descriptions or shown in the accompanying drawings shall be interpreted as illustrative and not in a limiting sense.

Terms such as "proximate," "distal," "upper," "lower," "inner," "outer," "inwardly," "outwardly," "exterior," "interior," and the like when used herein refer to positions of the respective elements as they are shown in the accompanying drawings, and the disclosure is not necessarily limited to such positions. Terms such as "first," "second," and other numerical terms when used herein do not imply a sequence or order unless clearly indicated by the context.

When introducing elements or features and the exemplary embodiments, the articles "a," "an," "the" and "said" are intended to mean that there are one or more of such elements or features. The terms "comprising," "including," and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It will also be understood that when an element is referred to as being "operatively connected," "connected," "coupled," "engaged," or "engageable" to and/or with another element, it can be directly connected, coupled, engaged, engageable to and/or with the other element or intervening elements may be present. In contrast, when an element is referred to as being "directly connected," "directly coupled," "directly engaged," or "directly engageable" to another element, there are no intervening elements present. Other words used to describe the relationship between elements should be interpreted in a like fashion (e.g., "between" versus "directly between," "adjacent" versus "directly adjacent," etc.).

What is claimed is:

1. A portable bed comprising:
   a foldable main frame assembly comprising a plurality of adjustable legs and a strap assembly for positioning the portable bed in position with a bleacher seat wherein the strap assembly includes a clamp for attaching the strap assembly to the bleacher seat wherein the clamp includes a gripper having a clamping lobe for gripping a strap, wherein the foldable main frame assembly comprises a generally rectangular frame wherein at least one of the plurality of adjustable legs are braced by at least one brace, and wherein the rectangular frame comprises a first longitudinal member, a second longitudinal member, a third longitudinal member, and a fourth longitudinal member operatively connected together connected by a plurality of longitudinal brackets, and a first transverse member, a second transverse member, a third transverse member, and a fourth transverse member operatively connected together by a plurality of transverse brackets, and wherein each of the longitudinal and transverse members of the rectangular frame have at least one pivotal connection with an adjacent longitudinal and transverse member; and
   a bedding disposed on the main frame assembly.

2. The portable bed of claim 1 wherein the first longitudinal member, the second longitudinal member, the third longitudinal member, the fourth longitudinal member, the first transverse member, the second transverse member, a third transverse member, and the fourth transverse member are made from rectangular tubing.

3. The portable bed of claim 2 further comprising a plurality of corner brackets operatively connected to the first longitudinal member, the second longitudinal member, the third longitudinal member, the fourth longitudinal member, the first transverse member, the second transverse member, a third transverse member, and the fourth transverse member to generally retain the rectangular shape of the rectangular frame.

4. The portable bed of claim 3 wherein a first T bracket is pivotally connected to the first longitudinal member and the second longitudinal member, and wherein a second T bracket is pivotally connected to the third longitudinal member and the fourth longitudinal member.

5. The portable bed of claim 4 wherein a corner leg assembly is pivotally connected to each of the first longitudinal member, the second longitudinal member, the third longitudinal member, and the fourth longitudinal member by a corner leg assembly bracket, and wherein a center leg assembly is disposed on the first and second T bracket brackets.

6. The portable bed of claim 5 wherein the corner leg assembly comprises a first upper leg assembly, a first lower leg assembly, and a foot pad.

7. The portable bed of claim 6 wherein the center leg assembly comprises a second upper leg assembly, a second lower leg assembly, and the foot pad.

8. The portable bed of claim 7 wherein the first lower leg assembly can telescopically engage with the first upper leg assembly of the corner leg assembly, and wherein the second lower leg assembly can telescopically engage with the second upper leg assembly of the center leg assembly.

9. The portable bed of claim 8 wherein each of the corner leg assembly and the center leg assembly further comprise a plurality of detent pins and detent pin openings sized and configured to allow the detent pin to slidably reside within the detent opening to retain the adjusted height of the corner leg assembly and the center leg assembly.

10. The portable bed of claim 9 wherein the strap assembly comprises a strap, a clamp, and a strap length adjuster.

11. The portable bed of claim 10 wherein the clamp comprises a gripper, a clamp body, an upper clamp, a lower clamp, and a lower body, wherein the gripper is pivotally attached to the clamp body, the upper clamp is pivotally attached to the clamp body, the lower clamp [87] is pivotally attached to the lower body, and the clamp body is pivotally attached to the lower body.

12. The portable bed of claim 11 wherein the gripper includes a clamping lobe at a distal end for clamping a strap between the gripper and the clamp body.

13. The portable bed of claim 12 wherein the clamp further comprises a clamp pivot point around which the clamp body pivots in relation to the lower body.

14. The portable bed of claim 13 wherein the clamp body is biased away from a portion of the lower body in a manner that tends to keep the upper clamp pressed against the lower clamp at a distal side of the clamp pivot point by a spring mounted at the clamp pivot point such a first spring extension presses against a lower surface of the clamp body and a second spring extension presses an upper surface of the lower body.

15. A portable bed comprising:
a foldable main frame assembly comprising a plurality of adjustable legs;
a bedding disposed on the main frame assembly; and
a strap assembly operatively connected to the bedding wherein the strap assembly is used for positioning the portable bed in position with a bleacher seat wherein the strap assembly comprises a strap, and a clamp, wherein the clamp has a gripper having a clamping lobe at a distal end of the gripper, a clamp body, an upper clamp, a lower clamp, and a lower body, wherein the gripper is pivotally attached to the clamp body, the upper clamp is pivotally attached to the clamp body and the lower clamp is pivotally attached to the lower body, and the clamp body is pivotally attached to the lower body, wherein the clamp further comprises a clamp pivot point around which the clamp body pivots in relation to the lower body, and the clamp body is biased away from a portion of the lower body in a manner that tends to keep the upper clamp pressed against the lower clamp at a distal side of the clamp pivot point by a spring mounted at the clamp pivot point such a first spring extension presses against a lower surface of the clamp body and a second spring extension presses an upper surface of the lower body.

16. The portable bed of claim 15 wherein the foldable main frame assembly comprises a generally rectangular frame wherein at least one of the plurality of adjustable legs are braced by at least one brace, wherein the rectangular frame comprises;
a first longitudinal member, a second longitudinal member, a third longitudinal member, and a fourth longitudinal member operatively connected together connected by a plurality of longitudinal brackets, and a first transverse member, a second transverse member, a third transverse member, and a fourth transverse member operatively connected together by a plurality of transverse brackets, and wherein each of the longitudinal and transverse members of the rectangular frame must have at least one pivotal connection with an adjacent longitudinal and transverse member;
a plurality of corner brackets operatively connected to the first longitudinal member, the second longitudinal member, the third longitudinal member, the fourth longitudinal member, the first transverse member, the second transverse member, a third transverse member, and the fourth transverse member to generally retain the rectangular shape of the rectangular frame;
a first T bracket is pivotally connected to the first longitudinal member and the second longitudinal member, and wherein a second T bracket is pivotally connected to the third longitudinal member and the fourth longitudinal member;
a corner leg assembly is pivotally connected to each of the first longitudinal member, the second longitudinal member, the third longitudinal member, and the fourth longitudinal member by a corner leg assembly bracket;
a center leg assembly is disposed on the first and second T bracket brackets wherein each of the corner leg assembly and the center leg assembly comprise an upper leg assembly, a lower leg assembly, and a foot pad, and wherein the lower leg assembly can telescopically engage with the upper leg assembly; and,
a plurality of detent openings sized and configured to allow a detent pin to slidably reside within each of the detent openings to retain the adjusted height of the corner leg assembly and the center leg assembly.

17. The portable bed of claim 16 wherein the first longitudinal member, the second longitudinal member, the third longitudinal member, the fourth longitudinal member, the first transverse member, the second transverse member, a third transverse member, and the fourth transverse member are made from rectangular tubing.

* * * * *